Jan. 26, 1926.
H. R. SMITH
GAUGE FOR OIL TANKS
Filed Sept. 20, 1923
1,570,790
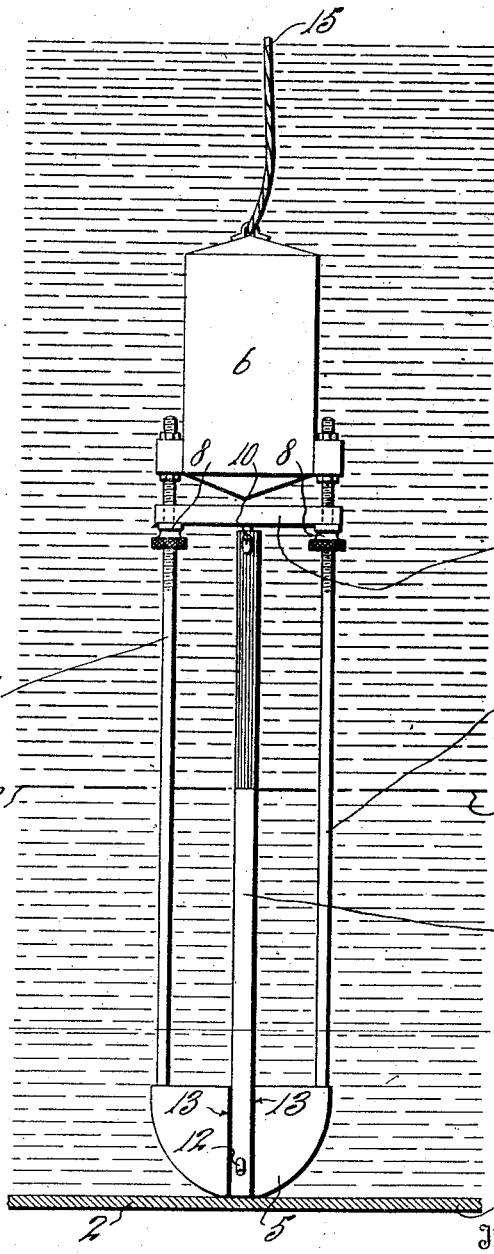
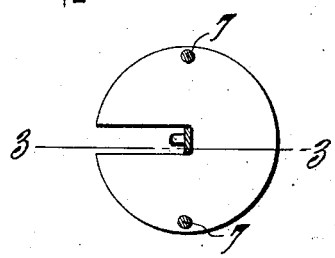
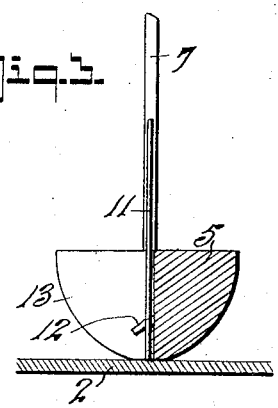
Inventor
H. R. Smith
By Albert E. Dietrich
Attorney Patented Jan. 26, 1926.

1,570,790

UNITED STATES PATENT OFFICE.

HENRY RODIN SMITH, OF PRINCE RUPERT, BRITISH COLUMBIA, CANADA.

GAUGE FOR OIL TANKS.

Application filed September 20, 1923. Serial No. 663,868.

*To all whom it may concern:*

Be it known that I, HENRY R. SMITH, citizen of the Dominion of Canada, residing at Prince Rupert, in the Province of British Columbia, Canada, have invented certain new and useful Improvements in Gauges for Oil Tanks, of which the following is a specification.

This invention relates to a gauge for determining the depth of water below the oil in an oil tank.

Fuel oil is unavoidably and sometimes intentionally associated with water, which settles to the bottom of the tank, so that in ascertaining the amount of oil in the tank it is necessary to know what depth of water there is below the oil.

The difference in the specific gravity between the oil and water is not sufficient to enable this characteristic to be used for ascertaining the water level, and fuel oil is too viscid and too variable in its viscosity under variations of temperature, to enable a gauge glass to be used for the purpose.

It is customary to use a weighted stick about three feet long, along which a strip of paper is secured which has been varnished with a solution of glue. This stick is passed to the bottom of the tank through the manhole and is allowed to remain there long enough for the water to dissolve the glue, which material the oil will not attack.

When the stick is removed the length of the strip of paper from which the glue has been dissolved, is taken as representing the depth of water at the bottom of the tank.

This method is open to objection in that capillary attraction between the paper and the stick and the porosity of the paper itself, draws up the water and dissolves the glue above the true level of the water and thereby gives a false record of sometimes as much as an inch and half, which over the area of a large tank means a considerable error.

In the device, which is the subject of this application, these objections are overcome by connecting a conical ended sinker to a float by two substantially rigid spaced apart rods, between which rods and between the sinker and the float a thin strip of a material impervious to moisture and varnished with the glue solution may be stretched straight.

The buoyancy of the float is only sufficient to maintain the rods and gauging strip in an upright position when the sinker is lowered to the bottom of the tank by a light line. The strip being free from contact or immediate proximity with the supporting rods, the water level thereon will not be affected by capillary attraction, and being impermeable to moisture the glue solution will be dissolved from it to the true depth only of the water in the bottom of the tank.

The device is particularly described in the following specification, reference being made to the drawings by which it is accompanied, in which:

Fig. 1 is a front elevation of the device as resting on the bottom of the tank.

Fig. 2 is a sectional plan on the line 2—2 in Fig. 1, and

Fig. 3 is a section of the sinker on the line 3—3 in Fig. 2.

In these drawings 2 represents the bottom of the tank and 3 the level of the water below the oil content. The conical ended sinker 5 is connected to a hollow float 6 by two substantially rigid rods 7 removably connected to the sinker 5 and the float 6.

The upper ends of the rods 7 are threaded to receive nuts 8 immediately below the float 6 and a transverse member having a pin or hook 10 is slidable on the threaded ends and rests on the nuts 8. A thin strip 11 of light metal, such as aluminium, is stretched between the hook 10 and a hook 12 projecting from the bottom of the slot 13 in the sinker, adjacent the lower end, that the end of the strip may extend to the end of the sinker 5. The strip may thus be drawn tight by the nuts 8 between the sinker 5 and the member 9 adjacent the float.

This strip 11 is coated with a solution of glue and when the device is lowered through the oil and water to the bottom of the tank by means of a thin line 15 connected to the upper end of the float, the float will maintain it in an upright position and the solution of glue will be dissolved from the lower part of the strip 11 to the upper level of the water, but beyond that limit will be retained as the oil does not attack the glue.

The accuracy of the device as compared with methods at present in use for gauging the amount of water in an oil tank, is evidenced by the fact that after test the records of the device are accepted as correct by the Canadian customs officials.

Having now particularly described my invention, I hereby declare that what I claim as new and desire to be protected in by Letters Patent, is:

1. A device for the purpose specified comprising in combination a sinker, buoyant means, means spacedly connecting the sinker and buoyant means, a gauge strip extending between the sinker and buoyant means but clear of contact with the connecting means, which strip is coated with a material on which the water and oil have distinctively different actions, and means for lowering the sinker to the bottom of a tank.

2. A device for the purpose specified, comprising in combination, a sinker, a float, means for connecting the sinker to the float to maintain them a definite distance apart, a gauge strip removably connected between the sinker and the float to be clear of the connecting means, which strip is of a material on which water and oil have a distinctly different visible effect, and means for lowering the sinker to the bottom of a tank.

3. A device for the purpose specified, comprising the combination with a sinker, of a removable gauge strip upwardly projecting from the sinker, said strip being of a material impervious to moisture and coated with a material soluble in water and insoluble in oil, a float connected to the upper end of the strip that will maintain it in an upright position when immersed, and means for lowering the device to the bottom of the oil tank.

4. A device for the purpose specified, comprising the combination with a sinker, of relatively rigid rods secured to and upwardly projecting from the sinker, a float connected to the upper end of the rods, a transverse member slidably mounted on the rods, a gauge strip connected between the sinker and the transverse member which strip is covered with a material impervious to and insoluble in oil but soluble in water, and means for lowering the device to the bottom of an oil tank.

5. A device for the purpose specified, comprising the combination with a sinker, of relatively rigid rods secured to and upwardly projecting from the sinker, a float connected to the upper ends of the rods, a transverse member movable longitudinally of the rods, a nut threaded on the upper end of each rod adapted to support the transverse member, and a gauge strip connected between the sinker and the transverse member.

6. A device for the purpose specified, comprising the combination with a taper ended sinker having a slot extending inwardly from one side to adjacent the axis of the sinker and a pin secured in said slot and projecting in it adjacent the smaller end of the sinker, rods secured in and upwardly projecting from the upper side of the sinker, a float connected to the upper ends of the rods, a member movable longitudinally of the rods beneath the float, said member having a pin projecting from it, a nut threaded on the upper end of each rod and adapted to support the slidable member, a gauge strip removably connected between the pin on the sinker and that on the longitudinally movable member.

In testimony whereof I affix my signature.

HENRY RODIN SMITH.